(12) United States Patent
Váradi

(10) Patent No.: US 11,409,428 B2
(45) Date of Patent: Aug. 9, 2022

(54) DRAG AND DROP MINIMIZATION SYSTEM

(71) Applicant: SAP SE, Walldorf (DE)

(72) Inventor: János Váradi, Ludwigshafen (DE)

(73) Assignee: SAP SE, Walldorf (DE)

( * ) Notice: Subject to any disclaimer, the term of this patent is extended or adjusted under 35 U.S.C. 154(b) by 767 days.

(21) Appl. No.: 15/440,554

(22) Filed: Feb. 23, 2017

(65) Prior Publication Data
US 2018/0239508 A1    Aug. 23, 2018

(51) Int. Cl.
*G06F 3/0486* (2013.01)
*G06F 3/04842* (2022.01)

(52) U.S. Cl.
CPC ........ *G06F 3/0486* (2013.01); *G06F 3/04842* (2013.01)

(58) Field of Classification Search
CPC ........................... G06F 3/0486; G06F 3/04842
USPC .................................................. 715/764, 769
See application file for complete search history.

(56) References Cited

U.S. PATENT DOCUMENTS

| | | | | |
|---|---|---|---|---|
| 5,760,773 A | * | 6/1998 | Berman | G06F 1/1626 345/672 |
| 5,874,943 A | * | 2/1999 | Fitzpatrick | G06F 3/0486 345/159 |
| 8,078,963 B1 | * | 12/2011 | Rosner | G06F 17/21 715/247 |
| 8,689,124 B2 | * | 4/2014 | Amacker | G06Q 30/0603 705/27.1 |
| 9,323,350 B2 | * | 4/2016 | Oda | G03G 15/50 |
| 9,720,557 B2 | * | 8/2017 | Steinbach | G06F 3/0481 |
| 9,747,019 B2 | * | 8/2017 | Yun | G06F 3/0488 |
| 10,126,927 B1 | * | 11/2018 | Fieldman | G06F 3/04847 |
| 2002/0161762 A1 | * | 10/2002 | Morita | G06F 21/10 |
| 2005/0166159 A1 | * | 7/2005 | Mondry | G06F 3/0486 715/769 |
| 2007/0128899 A1 | * | 6/2007 | Mayer | G06F 9/4406 439/152 |
| 2007/0240067 A1 | * | 10/2007 | Eldridge | G06Q 10/06 715/762 |
| 2009/0276701 A1 | * | 11/2009 | Nurmi | G06F 3/0238 715/702 |
| 2010/0037261 A1 | * | 2/2010 | Ohta | G06F 3/017 725/40 |
| 2010/0058214 A1 | * | 3/2010 | Singh | G06F 3/0486 715/769 |
| 2010/0083154 A1 | * | 4/2010 | Takeshita | G06F 3/0486 715/769 |
| 2010/0125806 A1 | * | 5/2010 | Igeta | G06F 3/0481 715/770 |

(Continued)

OTHER PUBLICATIONS

"Thumbnail," Microsoft Computer Dictionary, May 1, 2002, Microsoft Press, Fifth edition, p. 519.*

*Primary Examiner* — Andrew R Dyer
(74) *Attorney, Agent, or Firm* — Sterne, Kessler, Goldstein & Fox P.L.L.C.

(57) ABSTRACT

Disclosed herein are system, method, and computer program product embodiments for a drag and drop minimization system. An embodiment operates by detecting a drag event associated with a selected object located in a first location of a user interface. A visibility of the one or more portions of the selected object is modified during the drag event. A drop event corresponding to the drag event is detected. The visibility of the one or more modified portions of the selected object is restored after the drop event.

11 Claims, 5 Drawing Sheets

(56) References Cited

U.S. PATENT DOCUMENTS

| | | | |
|---|---|---|---|
| 2010/0281375 A1* | 11/2010 | Pendergast | G11B 27/034 715/723 |
| 2010/0283800 A1* | 11/2010 | Cragun | G06F 3/0481 345/661 |
| 2011/0092222 A1* | 4/2011 | Kuo | H04W 4/029 455/456.1 |
| 2012/0079375 A1* | 3/2012 | Ogino | G06T 11/60 715/274 |
| 2012/0079432 A1* | 3/2012 | Lee | G06F 3/0483 715/838 |
| 2012/0124514 A1* | 5/2012 | Yuniardi | G06F 3/048 715/802 |
| 2012/0260203 A1* | 10/2012 | Commarford | G06F 3/0486 715/769 |
| 2013/0083012 A1* | 4/2013 | Han | G05B 15/02 345/419 |
| 2013/0187866 A1* | 7/2013 | Kim | G06F 3/0488 345/173 |
| 2013/0275901 A1* | 10/2013 | Saas | G06F 3/0486 715/769 |
| 2014/0164285 A1* | 6/2014 | Ashburn | G06Q 10/067 705/36 R |
| 2014/0208262 A1* | 7/2014 | Huang | G06F 3/0481 715/800 |
| 2014/0215310 A1* | 7/2014 | Kim | G06F 3/04883 715/234 |
| 2014/0223328 A1* | 8/2014 | Thomas | G06F 3/14 715/747 |
| 2014/0372923 A1* | 12/2014 | Rossi | G06F 3/0486 715/769 |
| 2015/0012818 A1* | 1/2015 | Reichmann | G06F 17/2247 715/236 |
| 2015/0058770 A1* | 2/2015 | Steinbach | G06F 3/0481 715/767 |
| 2016/0041960 A1* | 2/2016 | Lim | G06F 3/0488 715/230 |
| 2016/0077685 A1* | 3/2016 | Fang | G06F 9/452 715/778 |
| 2016/0117072 A1* | 4/2016 | Sharifi | G06F 3/04842 715/769 |
| 2016/0231888 A1* | 8/2016 | Govindraj | G06F 3/0482 |
| 2017/0322695 A1* | 11/2017 | Simpson | G06F 16/16 |

\* cited by examiner

DRAG AND DROP MINIMIZATION SYSTEM

BACKGROUND

Users often use drag and drop functionality to move data from one location of an interface to another location of the interface. Typically, the user selects a portion of data using a mouse, and drags the selected portion to a different location of the interface where the data is moved and dropped. However, while being dragged, the selected portion may obstruct any data that may exist underneath the dragged portion. This makes it difficult if not impossible to see where the user is actually dropping the selected portion. Also, dragging the selected portion of data across extended distances over the geography of the interface can be cumbersome for a user. Thus, it may be difficult for the user to maintain the drag while navigating (such as scrolling) the user interface. These and other issues may increase (1) the likelihood of errors in dropping the selected portion in the wrong location, (2) the time involved in dragged and dropping, and/or (3) the consumption of resources required for dragging and dropping operations, and for correcting errors.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a drag and drop minimization system.

Figure 1:
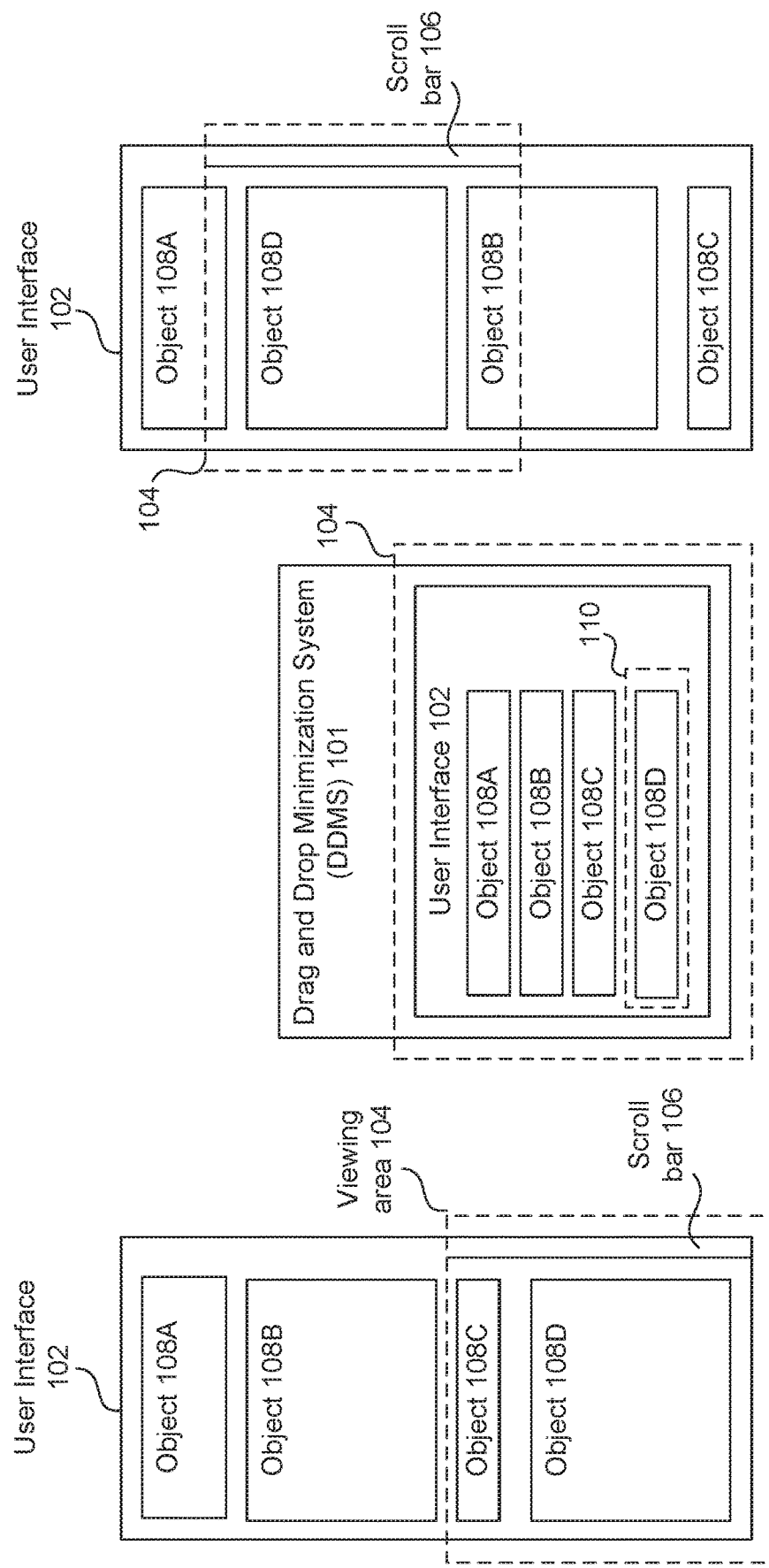
FIGS. 1A-IC illustrate example operations of a drag and drop minimization system (DDMS), according to some embodiments.

FIG. 1A is a block diagram of an example user interface 102 according to some embodiments. User interface 102 may be the visual interface for an application or computer program that is used or accessed by one or more users. User interface 102 may be accessible from one or more devices (e.g., laptops, tablets, mobile phones, etc.), each with a unique viewing area 104.

Viewing area 104 may be a screen of a device that displays user interface 102 or a portion thereof. As shown in the example of FIG. 1A, viewing area 104 may be smaller than the size of user interface 102. As such, to view or access the remainder of the elements in user interface 102 (that are not currently displayed or displayable within viewing area 104), a user may use a scroll bar 106. Using scroll bar 106, a user may scroll up, down, left, or right (or any other direction, such as diagonally) to see portions of user interface 102 that are not currently visible in viewing area 104. A user may also increase or decrease the zoom of viewing area 104, to increase or decrease the size of and number of elements that are displayed.

User interface 102 may include multiple display elements or objects 108. Objects 108 may include any display elements of user interface 102. Example objects 108 may include text, images (including selectable buttons), videos, multimedia, or other objects, to name just a few examples. Objects 108 may vary in size, shape, content, and functionality. An object 108 may include any displayable content or information, which may or may not be grouped. For example, an object 108 may include a group of text (and/or images or links) that is bundled together into a paragraph, chapter, article, or other grouping.

In an embodiment, object 108 may include data retrieved from a particular program or system (such as but not limited to a specified database), such that object 108 provides functionality of the program or access to the data. Different objects 108 may be associated with different programs, applications, data sources or systems within a single user interface 102. For example, object 108B may retrieve data from a first application while object 108C allows a user to access and modify data from a different application or system.

In an embodiment, a user may want to customize or personalize user interface 102 by changing what information, content, or objects 108 are displayed or the order in which different objects 108 are displayed. For example, a user may want to move more frequently accessed or more important objects 108 to the top of user interface 102 and less important or less used objects 108 to the bottom. Then, for example, the next time the user (or another user) logs into the system, the top-most objects 108 may be first displayed within viewing area 104 and more quickly or easily accessed.

Drag and drop is one technique that can be used to rearrange the objects 108 of user interface 102, according to some embodiments. With a drag and drop operation, a user may select a first object from a first location of user interface 102, drag that object across the geography of the user interface 102 to a second location, and drop the object in the second location, thereby moving the object from the first location to the second location of the user interface 102.

However, this drag and drop functionality can become cumbersome as the size of the selected object or content portion (shown as 110 in FIG. 1B for example) increases. The larger the selected object to be dragged, the more information of the user interface 102 or viewing area 104 it will obstruct during the drag operation. For example, when an object is dragged using conventional drag and drop functionality, the information beneath or below the dragged object is obstructed. This obstruction can hamper the ability of the user to determine where precisely the dragged object 108 should be placed because the user interface or device does not display (and the user cannot see) what data or information exists underneath the dragged object location. As such, the user may need extra time and resources in determining where to drop the selected object or may otherwise drop the selected object in the wrong location, then have to undo or redo this drag and drop operation, again consuming additional computing resources.

Also, a conventional drag and drop operation may be problematic as the distance between the drag location and the drop location increases. This problem may be exacerbated when the size of user interface 102 exceeds the size of the viewing area 104. In this situation, the user must maintain the drag on the object (often performed by keeping a mouse or other button depressed) while also scrolling or navigating to different areas of the user interface. This must be done without accidentally letting go of the depressed button, which would result in dropping the object in the wrong location (which may itself be obstructed by the size of the selected object).

As the distance, amount of screen space, or interface increases, the likelihood of error increases and the length of the drag and drop operation increases (e.g., consuming additional resources). Such drag and drop operations are cumbersome for the user, may result in accidental drop operations in the wrong locations, and waste resources particularly for extended drag and drop operations across large screen real estates.

According to some embodiments, a drag and drop minimization system (DDMS) 101 enables a more efficient drag and drop operation, thereby alleviating these issues with conventional drag and drop technology. DDMS 101 may reduce or even minimize how much of a selected object is visible and/or how much of other objects are visible during drag and drop operations. This may result in less data obstruction (thereby enabling the user interface to display objects that would have otherwise been obstructed). This may also reduce the amount of interface real estate that exists between a drag location and a drop location during a drag and drop operation. Accordingly, DDMS 101 may save system resources by alleviating the need for multiple drag and drop operations, and also improve user interface and screen visibility by making visible other objects 108 that may otherwise be obstructed.

FIGS. 1A-1C illustrate example operations of the DDMS 101, according to some embodiments. As shown in FIG. 1A, user interface 102 may include objects 108, of which only objects 108C and 108D are visible in the viewing area 104 of a particular device. However, using scroll bar 106, a user may access or make visible other objects 108A, 108B that are not immediately visible within viewing area 104. Assume that a user wishes to change the location of object 108D within user interface 102 using drag and drop functionality.

FIG. 1B shows an example of the drag and drop functionality of DDMS 101. In FIG. 1B, DDMS 101 may have detected a drag event 110 on object 108D. In an embodiment, the drag event 110 may be a highlight or selection of object 108D combined with a mouse movement (e.g., with a depressed key or finger) indicating an intent to drag the selected object or data. In another embodiment, a user may not need to maintain the mouse or finger depression throughout the entire drag and drop operation, but instead may use a finger tap, menu selection, or button press to indicate when to begin the drag operation and complete the drop operation.

In response to detecting drag event 110, DDMS 101 may reduce or minimize the size of selected object 108D and/or other non-selected objects 108A-C of user interface 102. This reduction or minimization of objects 108 may include various forms of modifying the appearance or visibility of objects 108. In an embodiment, the text size or image of a selected or non-selected object may be reduced or changed. For example, the zoom ratios of various objects may be temporarily altered during the drag and drop operation. Or, for example, rather than showing all the content of object 108D, DDMS 101 may select and display only a portion or summary of the content. The selected or displayed portion may include a title, summary, or other portion of the selected content of object 108D to be dragged. Alternatively or additionally, visibility (that is, display) of a selected or non-selected object may be disabled. DDMS 101 may perform similar operations with regard to the remaining, unselected objects 108A-C, particularly if user interface 102 exceeds the size of viewing area 104 (or exceeds it by a particular threshold).

By modifying what information is displayed for various objects 108, and/or modifying how those objects 108 are otherwise displayed during a drag and drop operation, DDMS 101 may reduce the size of user interface 102. For example, the pixel distance or geographic screen distance between a first object 108A and a second objects 108D, or between a drag location and drop location, may be reduced if one or both objects are displayed with reduced visibility (e.g., displaying object information in such a manner to reduce the screen space consumed by the visibility thereof). For example, as shown in FIG. 1B, reducing the size of objects 108 may reduce the overall size of user interface 102 to fit (or better fit) within viewing area 104. This modification of the visibility of objects 108 (selected and/or non-selected) may result in reducing the drag distance between a first location of a selected object 110 and a second location in user interface 102 where the selected object 110 is to be dropped.

This modification of the visibility of selected and/or non-selected objects 108, may enable a user to more quickly and accurately drag object 108D from a first location of user interface 102 to a second location of user interface 102, consuming less time, processing cycles, and other resources in the process. DDMS 101 may also enable user interface 102 to make visible objects or content that would otherwise not be visible within viewing area 104 (e.g., either due to being obstructed by dragged content or the size of user interface 102 relative to the size of viewing area 104). For example, as shown in the example of FIG. 1B, the reduction of displayed information may reduce the size of user interface 102 to fit within viewing area 104. This may enable a more efficient, accurate and faster drag and drop command consuming less resources and processing cycles. In another embodiment, reduced user interface 102 (e.g., during a drag operation) may still exceed viewing area 104 but the scroll distance may nonetheless be reduced and the processing improved as described herein.

In the example shown in FIG. 1B, both selected object 108D and non-selected objects 108A-C are reduced in response to drag event 110. In an embodiment, objects 108 may be reduced proportional to fit within viewing area 104. However, in other embodiments, only selected object 104D may be reduced (or minimized), or only other non-selected objects 108A-C may be reduced or minimized. Or, for example, those objects that exceed a particular size threshold or are of a particular content type may be minimized (or not minimized) in response to a drag event 110. As used herein, minimization, reduction, and modification may be used interchangeably.

In an embodiment, different objects 108A-D may be reduced by different proportions, such that they appear to be of different sizes or display different selected content. Also, selected portions of an object 108 may be enabled or remain visible, while other portions of the object 108 may be disabled or made temporarily not visible (for the duration of the drag and drop operation). For example, during a drag operation, while object 108A may display a title of a section of information (with the visibility of any remaining portions being disabled), object 108B may include both a title and an image of a different section of information. Further, the titles of different objects 108 may be displayed in different sizes or other attributes (e.g., which may correspond to their relative importance or the structure of a document or user interface 102).

An example result of a drag and drop operation is shown in FIG. 1C. Assume object 108D has been dragged and dropped between objects 108A and 108B. As such, the focus of viewing area 104 may be on where object 108D was dropped. Upon receiving or detecting the drop command, DDMS 101 may return the objects 108 to their original size with the new configuration or layout (as indicated by the drag and drop command). For example, upon detecting or receiving a drop event, DDMS 101 may undo the temporary display changes that appeared on user interface during the drag command or event.

Figure 2:
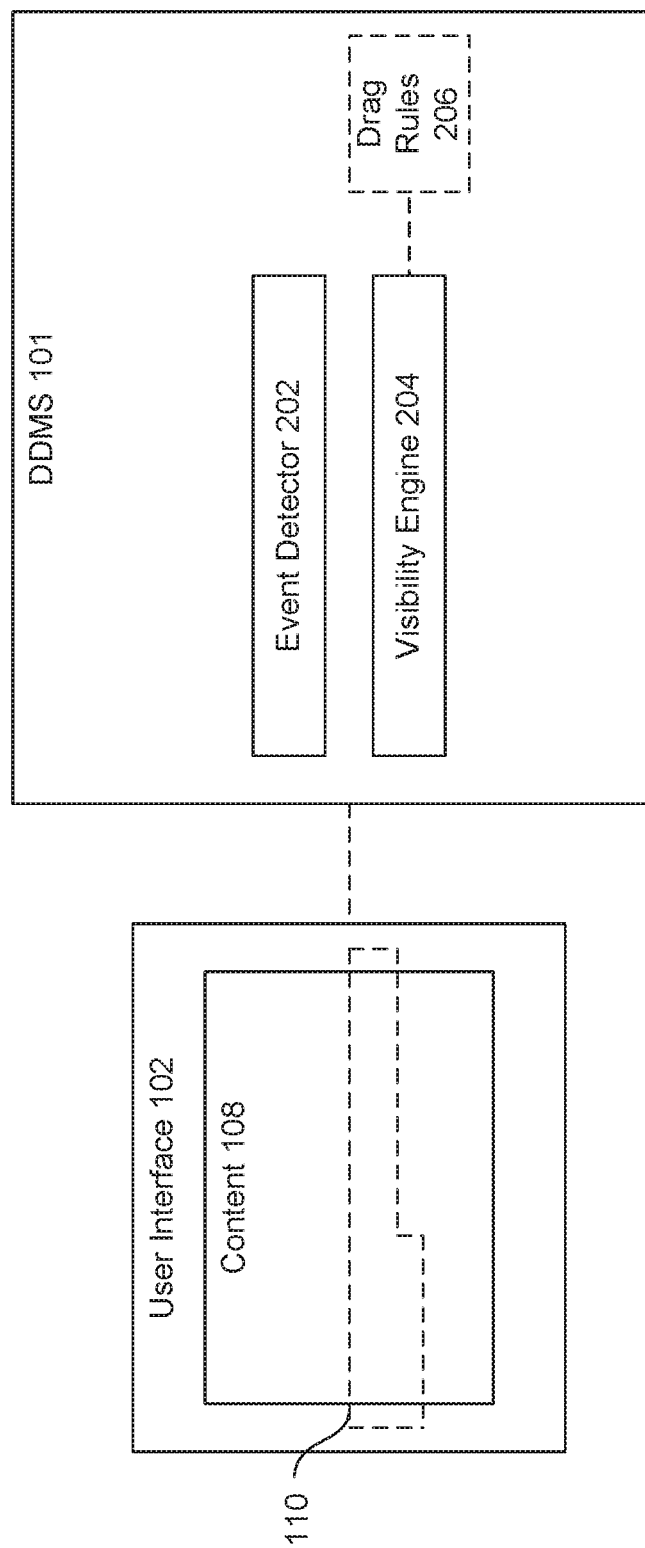
FIG. 2 is block diagram of a drag and drop modification system (DDMS), according to some embodiments.

FIG. 2 is a block diagram of a drag and drop modification system (DDMS) 101, according to some embodiments. DDMS 101 may include an event detector 202. Event detector 202 may detect when a drag operation is beginning, and may identify which object(s) 108 or portions of user interface 102 have been selected for dragging. In an embodiment, a drag operation may include a selection 110 of a portion of the display elements or content 108 of user interface 102 and a depressed mouse button selection (or touch screen selection) with a movement of the mouse (thus indicating a user's desire to move the selected portion).

Visibility engine 204 may determine which objects 108 (or portions thereof) are visible during the drag operation based on drag rules 206. Drag rules 206 may indicate where the selected portion 110 of content 108 may be allowed to be dropped. Drag rules 206 may also indicate what remains visible, hidden, magnified, or reduced (e.g., de-magnified) during the drag operation of different objects or content 108. In different embodiments, depending on which object(s) or content portions are selected 110, different objects 108 of user interface 102 may be hidden, remain visible, minimized, have selected portions thereof made or remain visible, or be visually represented in other ways.

Drag rules 206 may indicate, for example, that all video content 108 of user interface 102 is reduced in size and represented by only the title of the video. In an embodiment, the representation may include an icon or graphic indicating the type of content (e.g., that content is video content). Drag rules 206 may indicate that particular content objects 108 (such as grouped paragraphs, or data retrieved from a particular application) cannot be broken up via a drag and drop operation. As such, during the drag operation, the size may be reduced and a content summary may be provided for the entire section of content (whether it is selected or not selected). Or, for example, less information (resulting in less display area consumed) may be allocated to objects or information 108 of user interface 102 where selected content 110 cannot be dropped relative to locations or content areas 108 where selected content 110 can be dropped.

In an embodiment, content summary or other displayed portions of objects or content 108 may be determined from meta data associated with the content. For example, a particular object 108 may indicate that the tile of the object (e.g., such as file name or title of article) is to be displayed. Then, for example, DDMS 101 may retrieve the title from the metadata of the object 108, and make or keep the title visible during a drag and drop operation. Or, for example, different objects 108 may include metadata indicating what to make visible, keep visible, or to hide during a drag and drop operation. In an embodiment, this metadata may be retrieved and stored as drag rules 206.

In an embodiment, drag rules 206 may apply only to objects 108 that exceed a particular size threshold (e.g., pixel size, a size relative to other objects 108, a size relative to user interface 102 or visible area 104). For example, only objects 108 that consume more than a particular percentage of the size of visible area 104 may be reduced. DDMS 101 may minimize objects (e.g., reduce magnification or change visible content of objects) that exceed the size threshold, based on drag rules pertaining to that object and/or the selected object, or their respective types. For example, a first non-selected section of content 108 may be reduced because it exceeds a particular size threshold while a second non-selected section 108 of content may not be reduced because it falls within the screen allocation threshold (e.g., the amount of screen space a particular object or section of content 108 may consume during a particular drag operation).

Drag rules 206 may indicate that selected text 110 of content 108 may only be dragged and dropped to other text portions of content area 108. As such, any non-text objects 108 may be minimized via drag rules 206. In an embodiment, drag rules 206 may display locations or content blocks 108 where the selected portion 110 may be dragged differently (e.g., with greater detail or being allocated greater display area) than those content blocks 108 where selected portion 110 cannot be dragged (e.g., such as in the middle of a particular article or image).

In an embodiment, event detector 202 may detect a hover operation. A hover operation may be a drag operation that remains in a particular location on user interface 102 for an extended period of time (beyond a threshold). Event detector 202 may interpret a hover operation as being a preview operation, and may expand one of the selected object 110 and/or the underlying minimized object(s) 108. For example, DDMS 101 may temporarily undo the minimization that was performed during the drag operation when a hover operation is detected. This may enable a preview of what the user interface would look like upon a drop operation in a particular location. If event detector 202 detects a subsequent drag operation, the minimization may be resumed.

Event detector 202 may also detect a drop operation. Upon detection of a drop operation (corresponding to the drag operation), DDMS 101 may make visible previously hidden/minimized objects or elements, and may show user interface 102 with the moved (dragged and dropped) selected 110 in its new location. In an embodiment, the reduced size of objects 108 may be provided via an overlay or clone of user interface 102 which is activated or triggered on a drag event. The overlay may then be hidden upon a detection of the drop event (e.g., placing the selected object 110 in the dropped location).

In different embodiments, the functionality of DDMS 101 may be integrated with the operations of touch screen devices (e.g., that do not use a mouse), processing systems, or other devices. DDMS 101 may operate locally on a particular mobile device, or may be accessed remotely via a network.

Figure 3:
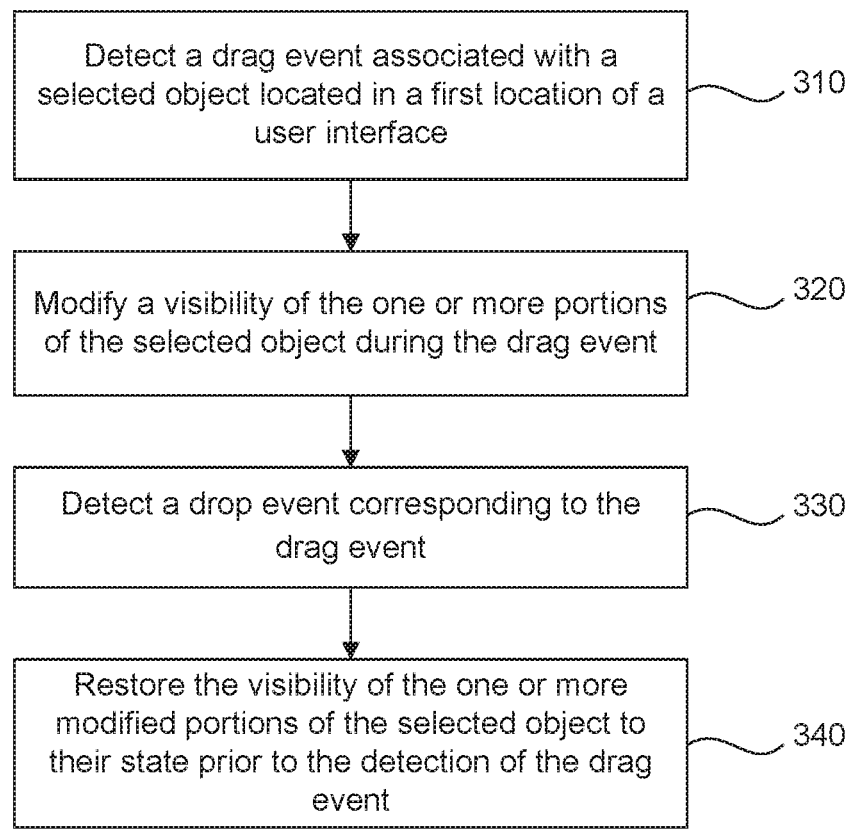
FIG. 3 is a flowchart for a run time method for a drag and drop modification system (DDMS), according to some embodiments.

FIG. 3 is a flowchart of a run time method 300 for a drag and drop modification system (DDMS), according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

At 310, a drag event associated with a selected object located in a first location of a user interface is detected. For example, event detector 202 of DDMS 101 may detect drag event 110. Drag event 110 may indicate a desire by a user to move a portion of user interface 102 content (such as one or more objects 108) from a first location to a second location of user interface 102. In an embodiment, a drag event may be triggered by selecting a portion of user interface and depressing a mouse key while moving the mouse in a particular direction (indicating an intent to move the selected content). Or, for example, a drag event could be a result of a button, menu, or other drag indicator that begins the drag operation.

The selected content or object(s), as displayed prior to the detection of the drag event, may consume a certain amount of content area. The content area may be a measure or amount of user interface 102 or viewing area 104 that is used to display the selected object. In an embodiment, the amount of content area may be measured in pixels, as a percentage of user interface 102 or view area 104, or may be expressed relative to other non-selected content or object(s) 108 that are displayed in either user interface 102 or viewing area 104.

At 320, a visibility of the one or more portions of the selected content or object(s) during the drag event is modified. For example, in the embodiment of FIG. 1B, based on drag rules 206, portions of the selected object 108D (e.g., 110) may be hidden during the drag event. In an embodiment, drag rules 206 may include metadata that indicates which portions of which objects 108 (e.g., selected or non-selected) may be reduced, disabled, minimized, altered or hidden during different drag events. The modified selected or non-selected objects 108 may consume less content area in user interface 102 after the modification performed in step 320 (and during the drag event) relative to the amount of content area they consumed prior to step 320. How the display area is reduced for each object 108 may be determined based on drag rules 206 and may vary by object 108 and/or object type.

For example, the non-selected objects that are visible during the drag of an image object may be different from non-selected objects that are visible during the drag of a block of a text object. This may be due at least in part because text objects may be allowed to be dropped to different locations in the user interface 102 compared to where image objects are allowed to be dropped (as specified by drag rules 206). Also, in an embodiment, based on drag rules 206, a first non-selected object 108 may be modified in different proportions than a second non-selected object 108. The differences in reduction may be based on the type of non-selected objects 108, the information displayed or available for display for each object, or which object 108 was selected, to name just a few examples. Such operation may reduce the size of the HTML DOM (hypertext markup language document object model) based on the drag rules 206.

At 330, a drop event corresponding to the drag event is detected. For example, event detector 202 may detect a drop event. The drop event may be, for example, a releasing of a finger press (on a touchscreen) or mouse depression. The drop event may indicate a second location of the user interface to which the selected content or object(s) is to be moved. In an embodiment, if the second location is an invalid location (as indicated by drag rules 206, for example), DDMS 101 may return the selected content or object(s) to its original location and restore the selected content or object(s) to their original size and appearance (i.e., prior to the modification in step 320).

At 340, after the drop, the visibility of any objects modified in step 320 may be restored to the state existing prior to operation of step 320. For example, when the selected content or object(s) is dropped in the second location, DDMS 101 may restore the visibility of any content which may have been disabled or modified during the drag event and return the content to its original size and visibility. Or, for example, DDMS 101 may undo whatever other temporary modifications that may have occurred during the drag event. As a result, all objects 108 will appear in user interface 102 as they did prior to detection of the drag event in 310, except the selected content or object(s) will now be positioned in the dropped location.

Figure 4:
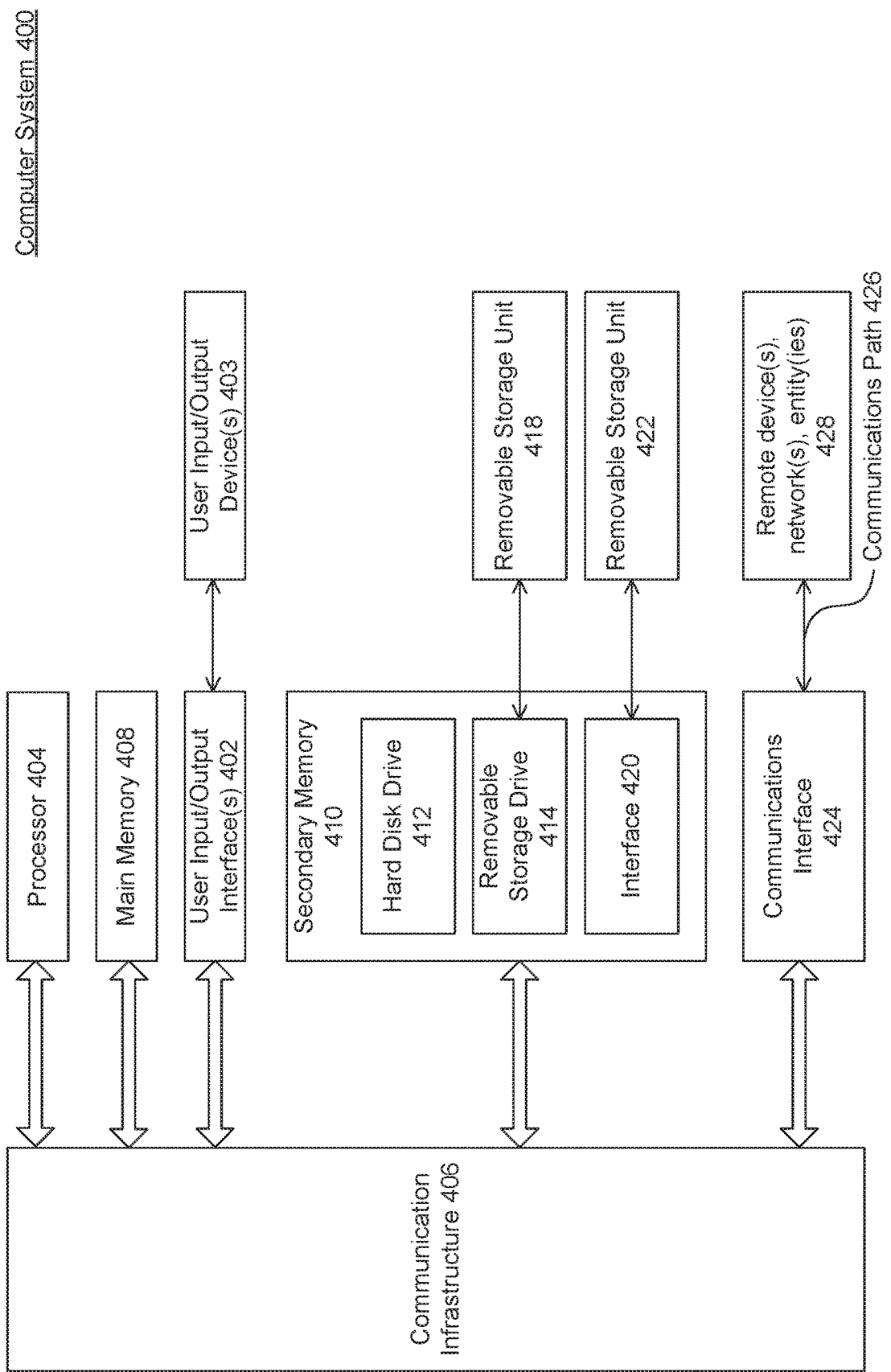
FIG. 4 is an example computer system useful for implementing various embodiments.

Various embodiments can be implemented, for example, using one or more computer systems, such as computer system 400 shown in FIG. 4. Computer system 400 can be used, for example, to implement the systems of FIG. 1 or 2, and/or the method of FIG. 3. Computer system 400 can be any computer capable of performing the functions described herein.

Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

Figure 5:
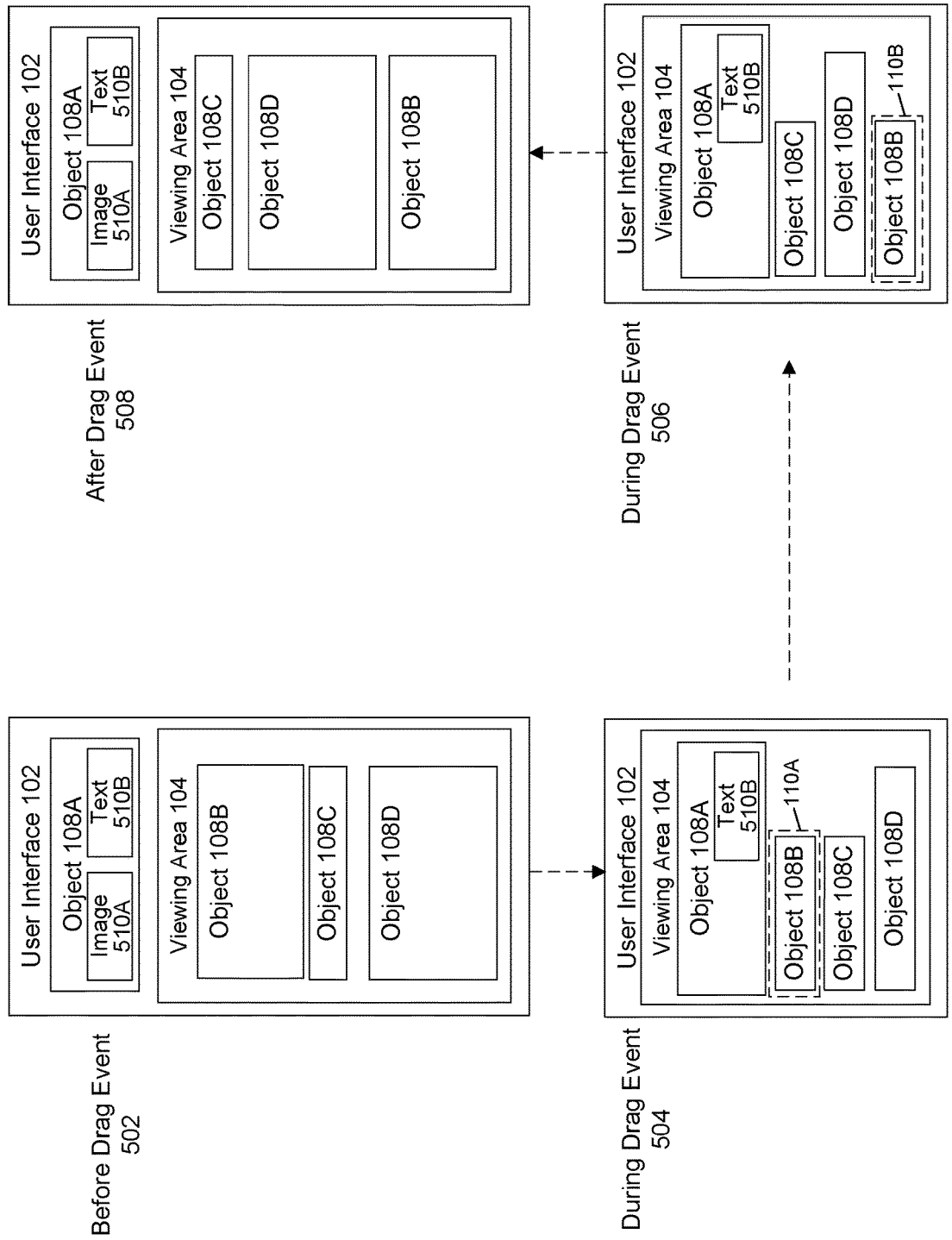
FIG. 5 illustrates example operations of a drag and drop minimization system (DDMS), according to some embodiments.

FIG. 5 illustrates block diagrams of an example user interface 102 according to some embodiments. The numbered objects of FIG. 5 correspond to the like-numbered objects previously described above, particularly with respect to FIGS. 1A-1C. The user interface 102 as illustrated in FIG. 5, operates in an identical manner as the user interface 102 as described above with respect to FIGS. 1A-1C.

At 502, the user interface 102 may including the various objects 108A-D in a particular order prior to or before a drag event, in which Object 108A does not fit inside of the viewing area 104 (e.g., that portion of user interface 102 that a user sees on the screen of their device).

As described above, a drag event may include a drag and drop operation performed by a user, during the drag event an object 108A-D may be moved from a first location to a second location within user interface 102. As described above, objects 108A-D may include text, images, or other content. This is further illustrated by text 510B and image 510A as illustrated in object 108A. For simplicity sake, the content of the remaining objects 108B-D has been included in FIG. 5.

At 504, a drag event 110A may be detected on object 104B. Upon detecting the drag event 110, DDMS 101 may reduce the sizes of at least a subset of the objects 104A-D to fit within viewing area 104. Reducing the sizes of the objects reduces the distances between the objects. For example, viewing area 104 at 502 and 504 are the same size, however, at 504, all the objects 108A-D are visible within the same sized viewing area 104. As illustrated with respect to Object 108A, rather than displaying both image 510A and text 510B, during the drag event 110A, only the text 501B may be visible within the viewing area.

At 506, the user may drag object 108B from a first location (at 504, between object 108A and object 108C) to a second location below object 108D. At 508, when a user releases a mouse button or otherwise terminates the drag event, the objects 108A-D are restored to their original sizes and content (e.g., object 108A displays both image 510A and text 510B again), but the new ordering and locations remain.

What is claimed is:

1. A computer implemented method, comprising:

detecting a drag event associated with a selected object located in a first location of a user interface, wherein a display of the selected object prior to the drag event consumes a first content area;

reducing a size of the user interface and a size of the selected object based on a viewing area during the drag event, wherein a display of the selected object during the drag event consumes a second content area that is less than the first content area within the user interface, and wherein a distance between the selected object and one or more non-selected objects on the user interface is reduced within the user interface;

reducing a size of a first one of the non-selected objects by a first proportion;

reducing a size of a second one of the non-selected objects by a second proportion different from the first proportion;

detecting a drop event corresponding to the drag event, wherein the drop event indicates a second location of the user interface to which the selected object is to be moved; and restoring, responsive to the detecting the drop event, the sizes of the selected object, the user interface, the first one of the non-selected objects and the second one of the non-selected objects.

2. The method of claim 1, further comprising:

modifying a visibility of one or more portions of one or more non-selected objects of the user interface during the drag event, wherein the modified one or more non-selected objects consume less content area during the drag event than before the detection of the drag event.

3. The method of claim 1, wherein a drag distance between the first location and the second location is reduced based on the modifying of the visibility of the one or more portions of the one or more non-selected objects.

4. The method of claim 2, wherein a portion of a first non-selected object is hidden based on the first non-selected object exceeding a visibility size threshold, and wherein a visibility of a second non-selected object remains unchanged based on the second non-selected object not exceeding the visibility size threshold.

5. The method of claim 1, wherein the reducing the size of the user interface comprises reducing a pixel distance between the first location and the second location on the user interface.

6. The method of claim 1, wherein the reducing the size of the user interface comprises reducing the size of the user interface to fit within the viewing area.

7. The method of claim 1, wherein the reducing the size of the first one of the non-selected objects comprises displaying at least one object within the user interface during the drag event, wherein the at least one object was not visible within the viewing area prior to the reducing.

8. A non-transitory computer-readable device having instructions stored thereon that, when executed by at least one computing device, causes the at least one computing device to perform operations comprising:

detecting a drag event associated with a selected object located in a first location of a user interface, wherein a display of the selected object prior to the drag event consumes a first content area;

reducing a size of the user interface and a size of the selected object based on a viewing area during the drag event, wherein a display of the selected object during the drag event consumes a second content area that is less than the first content area within the user interface, and wherein a distance between the selected object and one or more non-selected objects on the user interface is reduced within the user interface;

reducing a size of a first one of the non-selected objects by a first proportion;

reducing a size of a second one of the non-selected objects by a second proportion different from the first proportion;

detecting a drop event corresponding to the drag event, wherein the drop event indicates a second location of the user interface to which the selected object is to be moved; and restoring, responsive to the detecting the drop event, the sizes of the selected object, the user interface, the first one of the non-selected objects and the second one of the non-selected objects.

9. A system, comprising:

a memory; and at least one processor coupled to the memory and configured to:

detect a drag event associated with a selected object located in a first location of a user interface, wherein a display of the selected object prior to the drag event consumes a first content area;

reduce a size of the user interface and a size of the selected object based on a viewing area during the drag event, wherein a display of the selected object during the drag event consumes a second content area that is less than the first content area within the user interface, and wherein a distance between the selected object and one or more non-selected objects on the user interface is reduced within the user interface;

reduce a size of a first one of the non-selected objects by a first proportion;

reduce a size of a second one of the non-selected objects by a second proportion different from the first proportion;

detect a drop event corresponding to the drag event, wherein the drop event indicates a second location of the user interface to which the selected object is to be moved; and restore, responsive to the detecting the drop event, the sizes of the selected object, the user interface, the first one of the non-selected objects and the second one of the non-selected objects.

10. The system of claim 9, wherein the at least one processor is further configured to:

modify a visibility of one or more portions of one or more non-selected objects of the user interface during the drag event, wherein the modified one or more non-selected objects consume less content area during the drag event than before the detection of the drag event.

11. The system of claim 10, wherein a portion of a first non-selected object is hidden based on the first non-selected object exceeding a visibility size threshold, and wherein a visibility of a second non-selected object remains unchanged based on the second non-selected object not exceeding the visibility size threshold.

* * * * *